United States Patent [19]

Fleury et al.

[11] Patent Number: 5,427,803
[45] Date of Patent: Jun. 27, 1995

[54] TRICKLE PROCESS FOR VINEGAR PRODUCTION

[75] Inventors: Kurt Fleury, La Tour-de-Peilz; Vladimir Kalina, Lausanne; Jean-Jacques Zell, Blonay, all of Switzerland

[73] Assignee: Nestec S.A., Vevey, Switzerland

[21] Appl. No.: 986,460

[22] Filed: Dec. 4, 1992

[30] Foreign Application Priority Data

Dec. 20, 1991 [CH] Switzerland .................. 3805/91

[51] Int. Cl.⁶ .................. C12J 1/00; C12J 1/10; C12P 1/04
[52] U.S. Cl. .................. 426/17; 435/140; 435/170; 99/323.12
[58] Field of Search .................. 426/17; 435/140, 170, 435/310, 316, 823; 99/323.12; 165/93, 116, 157

[56] References Cited

U.S. PATENT DOCUMENTS

| | | |
|---|---|---|
| 2,236,153 | 3/1941 | Owens . |
| 2,335,065 | 11/1943 | Kedrovich . |
| 4,282,257 | 8/1981 | Kunimatsu et al. . |
| 4,661,356 | 4/1987 | Okuhara .................. 426/17 |

FOREIGN PATENT DOCUMENTS

| | | |
|---|---|---|
| 0185407 | 6/1986 | European Pat. Off. . |
| 0391846 | 10/1990 | European Pat. Off. . |
| 412548 | 7/1910 | France . |
| 508629 | 10/1920 | France . |
| 959218 | 3/1950 | France . |
| 833792 | 3/1952 | Germany . |
| 9140877 | 8/1984 | Japan . |
| 2044164 | 2/1987 | Japan . |
| 558012 | 12/1943 | United Kingdom . |
| 781584 | 8/1957 | United Kingdom . |
| 1101560 | 1/1968 | United Kingdom . |

OTHER PUBLICATIONS

Public Data base Abstract for European Patent 0 391 846 (1990).

Primary Examiner—Donald E. Czaja
Assistant Examiner—Curtis E. Sherrer
Attorney, Agent, or Firm—Vogt & O'Donnell

[57] ABSTRACT

Vinegar is produced by a trickling must through a plurality of separate support beds colonized with *Gluconobacter*. The temperature of the must is maintained between each bed so that the must temperature varies no more than 2° C. during passage through the plurality of beds.

15 Claims, 3 Drawing Sheets

TRICKLE PROCESS FOR VINEGAR PRODUCTION

BACKGROUND OF THE INVENTION

This invention relates to a process for the production of vinegar by fermentation and to an apparatus for carrying out this process.

Today, the production of vinegar world-wide is mainly carried out by two processes, namely by a fermentation process similar to ancestral techniques, in which an alcoholic must trickles through a bed of wood chips, and by a more recent process known as submerged fermentation.

A detailed description of these two types of process can be found, for example, in Great Britian patent Specification No. 781,584 and Great Britian Patent Specification No. 1,101,560.

As can be seen from these two British patent specifications and as is confirmed, for example, by U.S. Pat. No. 4,282,257, problems are involved in obtaining high outputs of a vinegar of high acetic acid content. If a process is modified to increase output, the vinegar obtained has a lower acetic acid content and vice versa.

Thus, outputs of 0.2 to 0.3 g acetic acid per m$^3$fermenter per hour for a final acetic acid content of 12 to 13% may be considered as typical of a trickle-phase fermentation process. Compared with these figures, Great Britian Complete Patent Specification No. 781,584 illustrates a 5-fold increase in output, for example, although the vinegar obtained contains only 7.5 acetic Similarly, the submerged fermentation process, which is more sophisticated and energy-intensive, typically enables a vinegar containing 12 to 13% acetic acid to be obtained with an output of 1 to 2 kg/m$^3$.h. By comparison with these figures, U.S. Pat. No. 4,282,257 illustrates a final acetic acid content increased to 20%, for example, although this is achieved with an output of apparently less than 0.5 kg/m$^3$.h.

SUMMARY OF THE INVENTION

The problem addressed by the present invention was to provide a process based on simple technology, in other words a trickle bed fermentation process, which would enable a vinegar of high acetic acid content to be obtained in a high output.

To this end, the process according to the present invention for the production of vinegar by fermentation, in which a must trickles downwards through a bed of acetic bacteria supports, is collected beneath the bed and, after cooling, is recirculated above the bed and in which an oxygen-containing gas is passed through the bed, is characterized in that:
  the must is made to trickle through a bed divided up into several vertically adjacent layers of said supports alternating with one or more perforated horizontal heat exchangers,
  the must is fermented by acetic bacteria of the genus *Gluconobacter* and
  a temperature favourable to the growth and/or to the activity of the *Gluconobacter* is maintained in the bed and does not differ by more than 2° C. over the height of the bed.

Similarly, an apparatus for carrying out the process according to the invention comprises a fermentation column, a collecting vessel beneath the column, a must distributor above the column and a recirculation pipe connecting the collecting vessel to the distributor via a recirculation pump and a heat exchanger and is characterized in that the fermentation column comprises a bed of acetic bacteria supports divided into several vertically adjacent layers of said supports carried by perforated plates and one or more perforated horizontal heat exchangers alternating with said layers.

DETAILED DESCRIPTION OF THE INVENTION

Using the process and apparatus according to the invention, it is possible to produce a vinegar containing approximately 13 to 15% acetic acid in an output of approximately 1 to 2 kg/m$^3$.h, for example, by a simple trickle-bed fermentation technology.

This increase in performance compared with a conventional trickle-bed fermentation process and apparatus can be explained by the choice of an acetic bacterium of the genus *Gluconobacter* normally used in submerged fermentation, which provides for a better transfer of oxygen to the surface of the supports, and by the division of the bed into several layers alternating with heat exchangers which enables a temperature difference of or less than 2° C. to be maintained over the height of the bed.

Maintaining a favourable temperature, for example between 18° and 32° C. and preferably between 26° and 32° C. with a variation of no more than 2° C., provides for uniform distribution of the biomass over the height of the bed and eliminates excessive inactivation zones (excessively high temperature) and inadequate bacterial growth and productivity zones (excessively low temperature). In addition, the division of the bed into several layers also provides for improved circulation of the oxygen-containing gas, such as air for example, through the bed, i.e., the aeration necessary for supplying the bacteria with oxygen.

In the present specification, the acetic acid or alcohol contents are expressed in % by weight/volume when they are not expressed in units of weight per units of volume.

The acetic bacteria supports used to carry out the process according to the invention may be chips, debris or small branches of pine, beech or birch, for example, or any other porous material to which the bacteria can attach themselves.

Generally, the must trickles through the bed at a rate corresponding to between 0.2 and 1.5 times the volume of the bed per h. Similarly, air is preferably passed upwards through the bed at a rate corresponding to between 2 and 10 times the volume of the bed per h.

In one particular embodiment of the process according to the invention, a submerged fermentation vinegar, for example of cider or wine, trickles through the bed and is recirculated in order to colonize the acetic bacteria supports. Cider or wine may then be added to the vinegar either continuously or intermittently. It is even possible continuously to add cider or wine and continuously to remove the vinegar produced.

In one preferred embodiment of the process according to the invention, a submerged fermentation alcohol vinegar is made to trickle through the bed and is recirculated in order to colonize the acetic bacteria supports. The vinegar in question may be taken with the *Gluconobacter* which it contains from a submerged fermentation tank used in a process for the production of alcohol vinegar. The vinegar may be used in a small quantity, for example corresponding to approximately 5/100 to 20/100 of the total volume of the bed.

To obtain a must, a fresh aqueous mixture containing 110–130 g/l alcohol, 5–20 g/l acetic acid, glucose, minerals and vitamins may be added to the vinegar, the acetic acid preferably being incorporated in the mixture in the form of production vinegar, more particularly after filtration and sterilization.

The fresh mixture may be added to adjust and maintain the acetic acid content of the must at 9.5–10.5% the alcohol content at 2.0–3.0%, the glucose content at 150–300 mg/l and the content of minerals and vitamins at the quantities necessary and sufficient for the growth and activity of the *Gluconobacter*. The latter nutrients may be introduced by using formulas known to the expert, such as Frings DS formula for example.

The fresh mixture may be added continuously or intermittently, depending on the acetic acid production rate.

To complete a first cycle of vinegar production, the addition of fresh mixture may be stopped when the acetic acid production rate reaches 0.2–0.3 g/l.h. If the apparatus used is one in which the volume of the collector is larger than or equal to the volume of the bed, this production rate can be reached before the collector is full. If it is full, the addition of fresh mixture may be stopped before the production rate reaches the level indicated. Trickling and recirculation of the must may be continued until its alcohol content is below or equal to 7 g/l, for example, and a large part of the vinegar thus obtained may be collected, leaving a small part, for example corresponding to approximately 5/100–20/100 of the total volume of the bed, for a subsequent cycle.

In order to carry out subsequent acetic acid production cycles, the fresh mixture may be added to a small part of the vinegar which was not collected at the end of a previous cycle to obtain a must. The fresh mixture may be added to adjust and maintain the acetic acid content of the must at 9.5–10.5 the alcohol content at 2.0–3.0%, the glucose content at 150–300 mg/l and the content of minerals and vitamins at values necessary and sufficient for the growth and activity of the *Gluconobacter*. The fresh mixture may he added continuously or intermittently, while maintaining the alcohol, acetic acid and nutrient contents of the must at the levels indicated, until a limit volume imposed by the dimensions of the apparatus used to carry out the process is reached. The addition of fresh mixture may then he stopped, trickling and recirculation of the must may he continued until its alcohol content is below or equal to 7 g/l, for example, and a large part of the vinegar obtained may be collected, leaving a small part for a subsequent cycle.

A series of production cycles each preferably 50–120 h in duration can be carried out in this way. The acetic acid content of the vinegar thus obtained can reach 12–15%, for example, from the first production cycle. The output in which the vinegar is thus obtained increases during the first production cycle and can rapidly reach a value of 1–2 kg/m$^3$. h, for example, for a yield of more than 85%.

In the series of production cycles described above, the expression "the addition of fresh mixture may be stopped" may be interpreted as not necessarily requiring complete stoppage of the addition and as leaving open the possibility of continuing the addition at a greatly reduced rate, more particularly at a rate approximately 5 to 15 times lower, for example.

The series of production cycles described above may be carried out at a favourable fermentation temperature of preferably 26° to 32° C. If it is desired to produce a vinegar having an acetic acid content at the upper end of the range mentioned above, i.e., above 15%, fermentation may be continued at a favourable temperature situated at the lower end of the preferred range mentioned above or even below that range. Thus, for an acetic acid content of approximately 15%, a temperature of approximately 26 to 28° C. may be recommended whereas, for an acetic acid content of up to 20%, a favourable temperature of as low as 18° C., for example, may be recommended.

In a variant of the above-described preferred embodiment of the process according to the invention, the fermentation temperature is thus lowered in so-called subsequent production cycles to a value favourable to the activity of the bacteria in a must of high acetic acid content when a significant quantity of must containing 9.5–10.5% acetic acid has been produced, for example after approximately 20–40 h from the beginning of the cycle, the addition of fresh mixture is stopped and a concentrated mixture containing 130–150 g/l acetic acid and 250–350 g/l alcohol, glucose, minerals and vitamins is added, preferably continuously, at a rate approximately 5 to 15 times lower than the rate at which fresh mixture is added. In this variant, a series of production cycles, each preferably 50–120 h in duration can thus be carried out. The acetic acid content of the vinegar thus obtained can reach approximately 14–20%, for example, and output can remain above 1 kg/m$^3$.h at least in a lower part of this range between approximately 14 and 16%.

Accordingly, the apparatus used to carry out the process according to the invention comprises a fermentation column, itself comprising a bed of acetic bacteria supports divided into several vertically adjacent layers carried by perforated plates, the supports consisting of chips, debris or small branches of pine, beech or birch, for example, or any porous material to which the bacteria can attach themselves. The column additionally comprises one or more horizontal heat exchangers which alternate with the layers of acetic bacteria supports.

If the usual dimensions of traditional apparatus for the production of vinegar by trickle-bed fermentation are taken into account and if it is desired to adapt them as simply as possible for the purposes of the process according to the present invention, the bed may comprise two to eight layers of supports alternating with one to seven horizontal heat exchangers for example. For a total height of the bed of approximately 1–2 m, for example, the layers may be between approximately 15 and 50 cm in thickness. The surface area of the layers, in other words, the cross-section of the column, may be selected or determined as a function of the quantity of vinegar to be produced per unit of time.

The perforated plates may be made in the form of screens, grills or perforated plates, for example of wood or stainless steel. In a first preferred embodiment of the apparatus according to the invention, the perforated plates and the perforated horizontal heat exchangers situated between two layers of supports are identical and may be made, for example, in the form of perforated heat exchanger plates, i.e., hollow perforated plates through which a heat-exchanging liquid, such as water for example, may be circulated.

In a second preferred embodiment of the apparatus according to the invention, each of the one or more perforated horizontal heat exchangers comprises several parallel horizontal channels, for example, in the form of U or V profiles, the bottom of each channel being drilled with a row of holes, and several parallel horizontal heat-exchanger tubes, i.e., tubes through which a heat-exchange liquid may be circulated, each arranged below a row of holes.

The apparatus for carrying out the process according to the invention is described by way of example in the following with reference to the accompanying drawings.

DETAILED DESCRIPTION OF THE DRAWINGS

Figure 1:
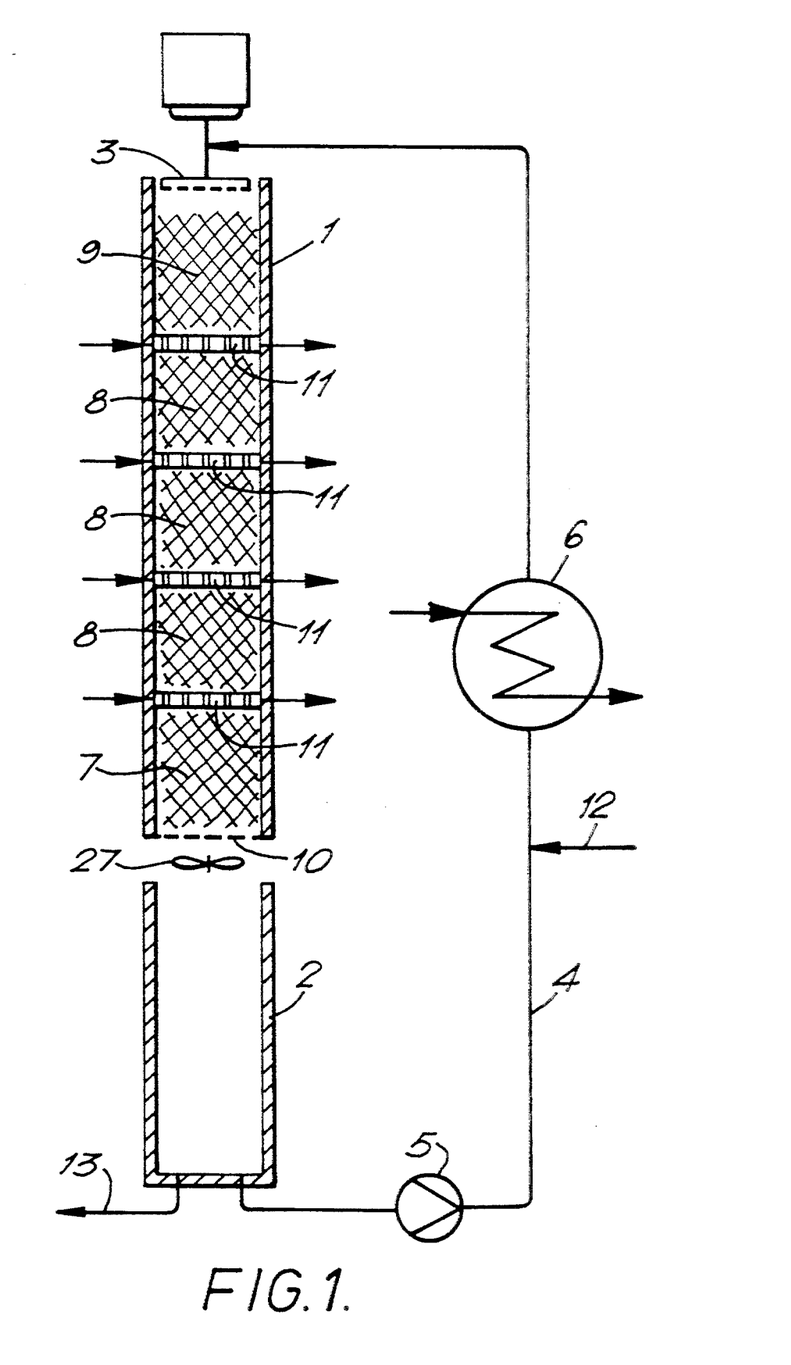
FIG. 1 diagrammatically illustrates the first preferred embodiment of the apparatus.

In the first preferred embodiment shown in FIG. 1, the apparatus comprises a fermentation column 1, a collecting vessel 2 beneath the column, a must distributor 3 above the column and a recirculation pipe 4 connecting the collecting vessel 2 to the distributor 3 via a recirculation pump 5, and a heat exchanger 6 and or propeller rotor 27

The fermentation column 1 comprises a bed of acetic bacteria supports divided into several vertically adjacent layers 7, 8, 9 of the supports carried by perforated plates 10, 11. The lower perforated plate 10 supporting a lower layer 7 of the bed, namely the first layer of the bed from the bottom, is made in the form of a screen or grill. Intermediate perforated plates, i.e., the perforated plates situated between two layers of supports, and the perforated horizontal heat exchangers are identical and are made in the form of perforated heat-exchanger plates 11. These plates are arranged in series or parallel to one another for the circulation of a heat-exchange fluid.

The distributor 3 is in the form of an arm drilled with holes which rotates in a horizontal plane above the bed, i.e., above an upper layer 9 of the bed, in other words above the last layer of the bed from the bottom.

FIG. 1 also shows a feed pipe 12 for fresh mixture and a pipe 13 for the removal of vinegar, both pipes being connected to the collector 2.

Figure 2:
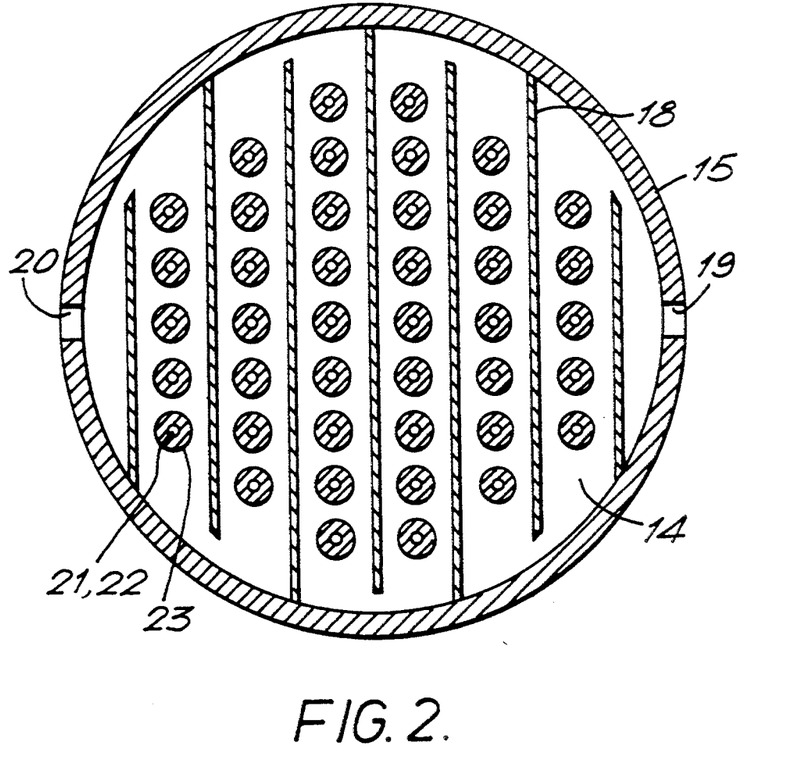
FIG. 2 is a horizontal section through a perforated heat-exchanger plate of the first embodiment of the apparatus shown in FIG. 1.
Figure 3:
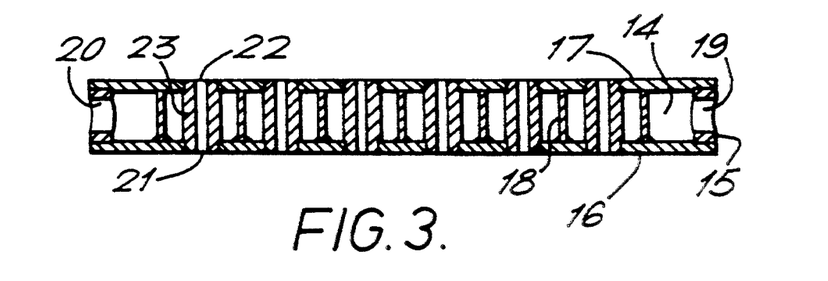
FIG. 3 is a vertical section through a perforated heat-exchanger plate of the first embodiment of the apparatus shown in FIG. 1.

A perforated heat exchanger plate 11 of this first preferred embodiment of the apparatus shown in FIG. 1 is illustrated in more detail in FIGS. 2 and 3. This plate is hollow, in other words it encloses an empty inner space 14 through which a heat-exchange liquid, particularly water, can be circulated. This space is delimited by an outer vertical cylindrical wall 15, a flat horizontal circular base 16 and a flat horizontal circular cover 17. In addition, the space is divided up into parallel channels arranged in the form of a chicane by vertical partitions 18. The vertical wall 15 is formed with openings 19 and 20 through which a heat-exchange liquid enters and leaves the chicane. The base 16 and the cover 17 are drilled with several parallel rows of holes, each hole 21 in the base being connected to a corresponding hole 22 in the cover by a vertical hollow cylindrical segment 23 sealed to the base and to the cover midway between two partitions 18.

Figure 4:
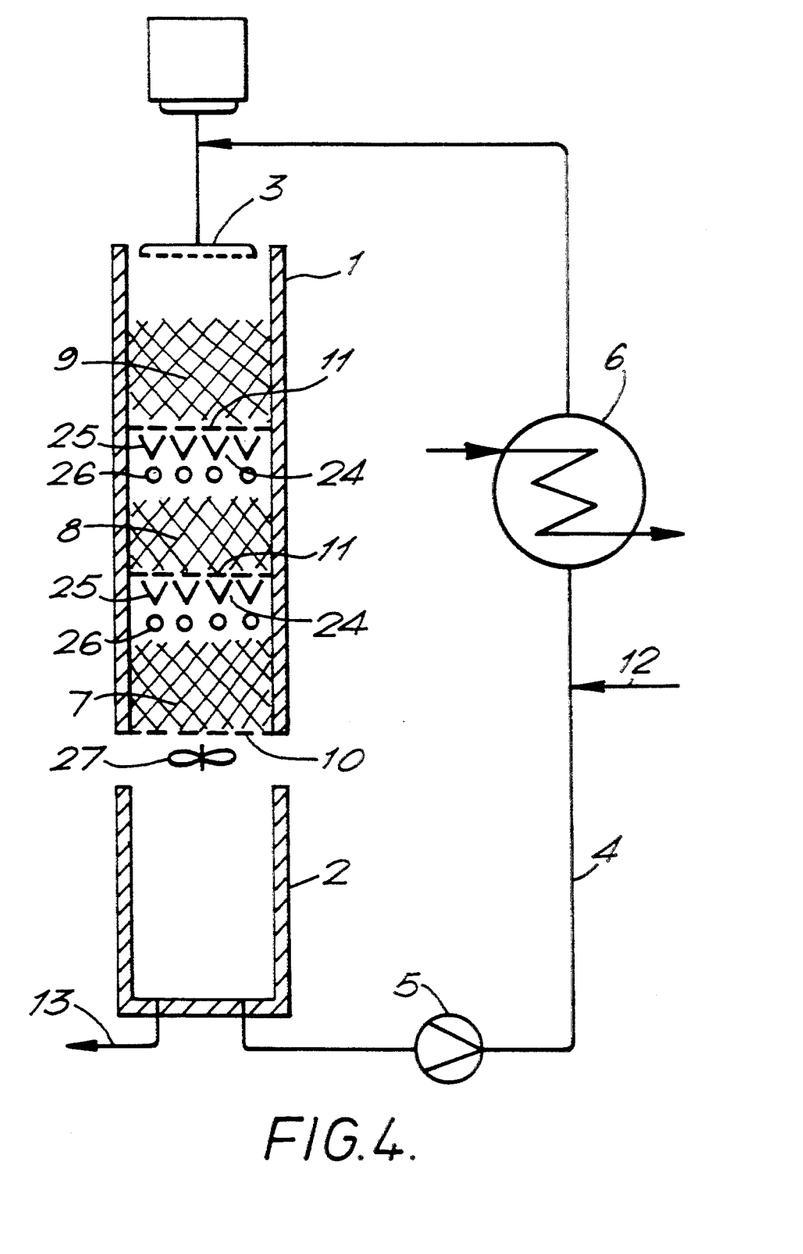
FIG. 4 diagrammatically illustrates the second preferred embodiment of the apparatus according to the invention.

In the preferred embodiment shown in FIG. 4, the apparatus also comprises a fermentation column 1, a collecting vessel 2 beneath the column, a must distributor 3 above the column and a recirculation pipe 4 connecting the collecting vessel 2 to the distributor 3 via a recirculation pump 5 and a heat exchanger 6 and a propeller rotor 27

FIG. 4 also shows a feed pipe 12 for fresh mixture and a pipe 13 for the removal of vinegar, both pipes being connected to the collector 2.

The fermentation column 1 comprises a bed of acetic bacteria supports divided up into several vertically adjacent layers 7,8,9 of the supports, carried by perforated plates 10,11 which are all in the form of wooden screens. The column 1 also comprises perforated horizontal heat exchangers 24 alternating with the layers 7,8,9. The heat exchangers 24 each comprise several parallel channels 25 in the form of V profiles, the bottom of each channel being drilled with a row of holes, and several parallel heat exchanger tubes 26 each arranged under a row of holes, i.e., aligned beneath the V channels.

EXAMPLES

The process according to the invention for the production of vinegar is illustrated by the following Examples in which percentages and parts are by weight, unless otherwise indicated.

EXAMPLE

The process is carried out using an apparatus of the type shown in FIGS. 1 to 3 in which a column 1.3 m in height and 14 cm in diameter for a volume of 20 1 comprises a bed of pine chips divided into five layers approximately 23 cm in thickness for a total volume of 17 l. The first layer from the bottom is supported by a stainless steel grill. The other layers are each supported by a perforated heat exchanger plate of stainless steel having a thickness of 2 cm. The collector has a volume 40 l.

A small quantity, equal to approximately 1/10 th of the total volume of the bed, of a submerged culture vinegar taken with the *Gluconobacter* which it contains from a submerged fermentation tank used in a process for the production of alcohol vinegar is introduced into the collector. The pine chips are colonized with the *Gluconobacter* by trickling the vinegar through the bed and recycling it above the bed while adding a fresh aqueous mixture containing 120 g/l alcohols, 10 g/l acetic acid, glucose, minerals and vitamins.

This fresh mixture is added initially to adjust and then to maintain the content of acetic acid in the must at 10.0–10.5%, the alcohol content at 2.0–2.5% and the glucose content at 150–170 mg/l, depending upon the acetic acid production rate. The nutrients glucose, minerals and vitamins are added in the form of Frings DS formula in sufficient quantities for the growth and activity of the *Gluconobacter*. The must is recirculated at a rate equal to 0.4 to 0.5 times the volume of the bed per hour. Air is blown upwards through the bed under an excess pressure of 5 mbar and at a rate equal to 3 times the volume of the bed per hour. The temperature of the bed is kept between 28 and 30° C. over its height.

When the acetification rate reaches 0.25 kg acetic acid per m³ bed per hour, the addition of fresh mixture is stopped and a first vinegar production cycle is carried out by continuing the trickling and recirculation of must until its alcohol content falls to 3 g/1. The acetic acid content of the vinegar thus obtained is approximately 13%.

A large part of the vinegar thus obtained is collected and a small part equivalent to 1/10th of the bed volume is left.

In order to carry out a subsequent acetic acid production cycle, fresh mixture is added to the vinegar left in the collector to obtain a must. The fresh mixture is added to the must to adjust and maintain the acetic acid content of the must at 10.0–10.5%, its alcohol content at 2.0–2.5% and its glucose content at 150–170 mg/1. The must is recirculated at a rate equal to 1.3 times the bed volume per hour. Air is blown upwards through the column in a quantity equal to 6 times the volume of the bed per hour.

When the collector is approximately 4/5ths full, the addition of fresh mixture is stopped and trickling and recirculation of the must are continued until its alcohol content falls to 7 g/1. This moment is reached after approx. 90 h. A large part of the vinegar thus obtained is collected and a small part equivalent to 1/10th of the bed volume is left.

Another eight subsequent cycles are then carried out in the same way and under the same conditions. The results obtained are set out in Table 1 below. A volume of vinegar equivalent to approximately 1.7 times the bed volume is thus obtained on average in approximately 4 d with a yield of approximately 85% and an output of approximately 2 kg acetic acid per m³ bed per hour for an acetic acid content of approximately 133 g/1 or 13.3%.

TABLE 1

| Cycle duration (h) | Vinegar collected (l) | Acetic acid content (g/l) | Alcohol content (g/l) | Output (kg/m³·h) |
|---|---|---|---|---|
| 88.5 | 26.2 | 129.6 | 5.3 | 1.94 |
| 88.9 | 26.7 | 131.1 | 5.6 | 1.99 |
| 94.4 | 29.0 | 135.6 | 6.6 | 2.12 |
| 99.0 | 29.6 | 137.0 | 7.1 | 2.08 |
| 97.7 | 28.8 | 132.0 | 8.5 | 1.96 |
| 89.9 | 28.1 | 129.6 | 7.8 | 2.05 |
| 92.7 | 28.8 | 133.6 | 7.0 | 2.12 |
| 92.5 | 29.3 | 130.5 | 7.5 | 2.10 |
| 94.6 | 29.8 | 133.6 | 5.3 | 2.14 |
| Average: | | | | |
| 93.1 | 28.42 | 132.5 | 6.74 | 2.06 |

Example 2

Using an apparatus similar to that used in Example 1, the process according to the invention is carried out in the same way as described in Example 1 except that, from the 36th hour of the first subsequent cycle and from the 36th hour of six other subsequent cycles, the temperature of the bed is kept at 26°–28° C. over its height, the addition of fresh mixture is stopped and a concentrated mixture prepared from production vinegar and alcohol containing 100–110 g/1 acetic acid and 277 g/1 alcohol is continuously added at a rate corresponding to 1/10th of the rate of the fresh mixture. Each of the seven cycles is thus continued for a total duration of approximately 100 h counting from the beginning of each cycle. The results set out in Table 2 below are obtained. A volume of vinegar equivalent to 1.1 times the bed volume is thus obtained on average in approximately 4 days with an output of approximately 1.3 kg acetic acid per m³ bed volume per hour for an acetic acid content of 146 g/1 or 14.6%.

TABLE 2

| Cycle duration (h) | Vinegar collected (l) | Acetic acid content (g/l) | Alcohol content (g/l) | Output (kg/m³·h) |
|---|---|---|---|---|
| 96.3 | 18.9 | 143.6 | 10.4 | 1.31 |
| 99.1 | 18.6 | 145.8 | 7.8 | 1.27 |
| 101.4 | 18.3 | 146.4 | 8.4 | 1.22 |
| 102.9 | 18.4 | 144.6 | 7.9 | 1.18 |
| 103.0 | 19.1 | 147.6 | 9.4 | 1.28 |
| 97.2 | 19.6 | 144.0 | 7.8 | 1.36 |
| 99.8 | 18.7 | 150.0 | 7.0 | 1.31 |
| Average: | | | | |
| 100.0 | 18.8 | 146.0 | 8.38 | 1.27 |

We claim:

1. In a process for production of vinegar, wherein a must is trickled through a support bed of acetic acid bacteria, an oxygen-containing gas is passed through the bed, must trickled through the bed is circulated to the bed for further trickling through the bed and vinegar is collected from the fermented must, the improvements comprising:

trickling a must containing a submerged fermentation *Gluconobacter*-produced alcohol vinegar at a temperature suitable for growth of *Gluconobacter* through a plurality of acetic acid bacteria support-containing beds vertically disposed and separated one from another for colonizing the *Gluconobacter*, maintaining the temperature of the trickling must between each separated bed so that the must temperature varies no more than 2° C. during passage through the plurality of beds and circulating the must passed through plurality of beds for trickling further through the beds for a period of time to obtain a fermented must alcohol content of 7 g/1 or below 7 g/1.

2. A process according to claim 1 further comprising initiating the process by first trickling an amount of the submerged fermentation *Gluconobacter*-produced alcohol vinegar through the plurality of beds and circulating the alcohol vinegar passed through the plurality of beds for trickling further through the beds for colonizing the beds.

3. A process according to claim 2 wherein the alcohol vinegar amount is a volume of from 5% to 20% of a total volume of the beds.

4. A process according to claim 2 wherein the alcohol vinegar trickled through and circulated to the beds is in an amount of from 5% to 20% of a total volume of the beds and further comprising adding to the circulating alcohol vinegar, over a period of time, an aqueous mixture of from 110 g/1 to 130 g/1 alcohol, from 5 g/1 to 20 g/1 acetic acid, and of nutrients glucose, minerals and vitamins sufficient for growth and activity of the *Gluconobacter*.

5. A process according to claim 4 wherein the mixture is added over the period of time in amounts and contains glucose in an amount so that an acetic acid content of from 9.5% to 10.5%, an alcohol content of from 2.0% to 3.0% and a glucose content of from 150 mg/1 to 300 mg/1 is obtained and maintained in the must.

6. A process according to claim 5 wherein the mixture is added in amounts over the period of time until fermentation production of acetic acid reaches a rate of from 0.2 g/l.h to 0.3 g/l.h.

7. A process according to claim 1 further comprising, upon the must having an alcohol content of 7 g/l or below 7 g/l, collecting vinegar from the must.

8. A process according to claim 7 wherein up to 95% of the vinegar is collected and further comprising circulating uncollected vinegar to and trickling the uncollected vinegar through the plurality of beds and adding to the circulating uncollected vinegar, over a period of time, an aqueous mixture of from 110 g/l to 130 g/l alcohol, from 5 g/l to 20 g/l acetic acid and of nutrients, glucose, minerals and vitamins sufficient for growth and activity of the Gluconobacter to obtain further must for circulation and trickling to and through the beds.

9. A process according to claim 8 wherein the mixture is added over the period of time in amounts and contains glucose in an amount so that an acetic acid content of from 9.5% to 10.5%, an alcohol content of from 2.0% to 3.0% and a glucose content of from 150 mg/l to 300 mg/l are obtained and maintained in the further must.

10. A process according to claim 8 wherein the further must is circulated and trickled for a time to obtain a further must alcohol content of 7 g/l or below 7 g/l.

11. A process according to claim 9 further comprising stopping addition of the mixture and then adding to the must, over a period of time, a second aqueous mixture containing from 130 g/l to 150 g/l acetic acid, from 250 g/l to 350 g/l alcohol, and nutrients glucose, minerals and vitamins sufficient for growth and activity of the *Gluconobacter*.

12. A process according to claim 1 wherein the temperature at which the must is maintained is within a range of from 18° C. to 32° C.

13. A process according to claim 1 wherein a volume of the must is trickled through the bed at a rate of from 0.2 to 1.5 times the volume of the bed per hour and wherein air is passed upwards through the bed in an amount from 2 to 10 times the volume of the bed per hour.

14. A process according to claim 1 wherein the must is trickled through from two to eight support-containing beds and the beds are comprised of a material selected from the group consisting of pine, beech and birch.

15. In a process for production of vinegar, wherien a must is trickled through a support bed of acetic acid bacteria, an oxygen-containing gas is passed through the bed, must trickled through the bed circulated to the bed for further trickling through the bed vinegar is collected from the fermented must, the improvements comprising:

first trickling an amount of a submerged fermentation *Gluconobacter*-produced alcohol vinegar through a plurality of support beds in an amount of from 5% to 20% of a total volume of the beds and circulating the alcohol vinegar passed through the plurality of beds for trickling further through the beds for colonizing the beds with *Gluconobacter*;

adding to the circulating alcohol vinegar, over a period of time, an aqueous mixture of from 110 g/l to 130 g/l alcohol, from 5 g/l to 20 g/l acetic acid, and of nutrients, glucose, minerals and vitamins sufficient for growth and activity of the *Gluconobacter* in an amount to obtain and maintain a must having an acetic acid content of from 9.5% to 10.5%, an alcohol content of from 2.0% to 3.0% and a glucose content of from 150 mg/l to 300 mg/l and stopping the addition when fermentation production of acetic acid reaches a rate of from 0.2 g/l.h to 0.3 g/l.h;

continuing trickling and circulating the must temperature suitable for growth of Gluconobacter through the plurality of beds for a period of time to obtain a fermented must containing vinegar and having an alcohol content of 7 g/l or below 7 g/l;

collecting up to 95% of the vinegar from the fermented must;

circulating uncollected vinegar to and trickling the uncollected vinegar through the plurality of beds and adding to the circulating uncollected vinegar, over a period of time, an aqueous mixture of from 110 g/l to 130 g/l alcohol from 5 g/l to 20 g/l acetic acid and of nutrients, glucose minerals and vitamins sufficient for growth and activity of the *Gluconobacter* to obtain and maintain a further must having an acetic acid content of from 9.5% to 10.5% an alcohol content of from 2.0% to 3.0%, and a glucose content of from 150 mg/l to 300 mg/l to obtain further must circulating and trickling to and through the beds and for a time to obtain a further fermented must containing vinegar and having an alcohol content of 7 g/l or below 7 g/l;

collecting the vinegar from the further fermented must; and maintaining, during the trickling and circulation of the alcohol vinegar and of the musts, a temperature of the trickling alcohol vinegar and musts between each separated bed suitable for growth of the *Gluconobacter* and so that the temperature of the alcohol vinegar and musts varies no more than 2° during passage through the plurality of beds.

* * * * *

UNITED STATES PATENT AND TRADEMARK OFFICE
CERTIFICATE OF CORRECTION

PATENT NO. : 5,427,803
DATED : June 27, 1995
INVENTOR(S) : Kurt FLEURY, et al.

It is certified that error appears in the above-indentified patent and that said Letters Patent is hereby corrected as shown below:

Column 1, line 60 insert a comma after "Gluconobacter".

Column 3, line 42, change "Gluconohacter" to --Gluconobacter--.

Column 5, line 35, delete "or" and insert therefore --a--.

UNITED STATES PATENT AND TRADEMARK OFFICE
CERTIFICATE OF CORRECTION

PATENT NO. : 5,427,803
DATED : June 27, 1995
INVENTOR(S) : Kurt FLEURY, et al.

It is certified that error appears in the above-indentified patent and that said Letters Patent is hereby corrected as shown below:

Column 8, line 38 (line 18 of claim 1), after "through", insert --the--.

Signed and Sealed this

Tenth Day of October, 1995

Attest:

BRUCE LEHMAN

Attesting Officer

Commissioner of Patents and Trademarks